(12) United States Patent
Li

(10) Patent No.: US 10,204,272 B2
(45) Date of Patent: Feb. 12, 2019

(54) METHOD AND SYSTEM FOR REMOTE MANAGEMENT OF LOCATION-BASED SPATIAL OBJECT

(71) Applicant: Yu-Hsien Li, Taipei (TW)

(72) Inventor: Yu-Hsien Li, Taipei (TW)

( * ) Notice: Subject to any disclaimer, the term of this patent is extended or adjusted under 35 U.S.C. 154(b) by 0 days.

(21) Appl. No.: 15/435,863

(22) Filed: Feb. 17, 2017

(65) Prior Publication Data

US 2018/0089510 A1 Mar. 29, 2018

(30) Foreign Application Priority Data

Sep. 23, 2016 (TW) .............................. 105130823 A

(51) Int. Cl.
| | | |
|---|---|---|
| *G06K 9/00* | (2006.01) | |
| *G06F 17/30* | (2006.01) | |
| *H04N 1/00* | (2006.01) | |
| *H04N 5/225* | (2006.01) | |

(52) U.S. Cl.
CPC ... *G06K 9/00671* (2013.01); *G06F 17/30061* (2013.01); *G06F 17/30241* (2013.01); *G06F 17/30259* (2013.01); *H04N 1/00244* (2013.01); *H04N 2201/0084* (2013.01); *H04N 2201/3253* (2013.01); *H04N 2201/3264* (2013.01); *H04N 2201/3266* (2013.01); *H04N 2201/3267* (2013.01)

(58) Field of Classification Search
CPC .................................. H04N 1/00; G06F 17/00
USPC ........................................... 382/103; 348/169
See application file for complete search history.

(56) References Cited

U.S. PATENT DOCUMENTS

| | | | |
|---|---|---|---|
| 9,013,505 B1 | 4/2015 | Thornton | |
| 2002/0055924 A1* | 5/2002 | Liming | ................. G01S 5/0027 |
| 2008/0268876 A1 | 10/2008 | Gelfand et al. | |
| 2011/0191271 A1 | 8/2011 | Baker et al. | |
| 2012/0105475 A1 | 5/2012 | Tseng | |
| 2012/0327172 A1 | 12/2012 | El-Saban et al. | |
| 2013/0120373 A1 | 5/2013 | Morinaga et al. | |
| 2014/0080428 A1 | 3/2014 | Rhoads et al. | |

FOREIGN PATENT DOCUMENTS

| | | |
|---|---|---|
| JP | 2011244398 A | 12/2011 |
| JP | 2014182479 A | 9/2014 |
| JP | 2016053776 A | 4/2016 |
| TW | I498025 B | 8/2015 |

\* cited by examiner

*Primary Examiner* — Abolfazl Tabatabai
(74) *Attorney, Agent, or Firm* — Li & Cai Intellectual Property (USA) Office

(57) ABSTRACT

The disclosure is relating to a method and a system for remote management of a location-based spatial object. The system includes a database and a server. The server provides a remote management interface such as in a form of an electronic map or a street view. The interface allows a subscriber to remotely set multiple spatial information for one spatial object. The server receives the spatial object and its corresponding spatial information from the subscriber over a network, combined with various search criteria relating to the spatial object, resulting in the establishment of consolidated information for the location-based spatial object in the database. The system allows an end user to search the location-based spatial object using a mobile device at any place, and the user can obtain the spatial object combined with an instant real scene image.

20 Claims, 14 Drawing Sheets

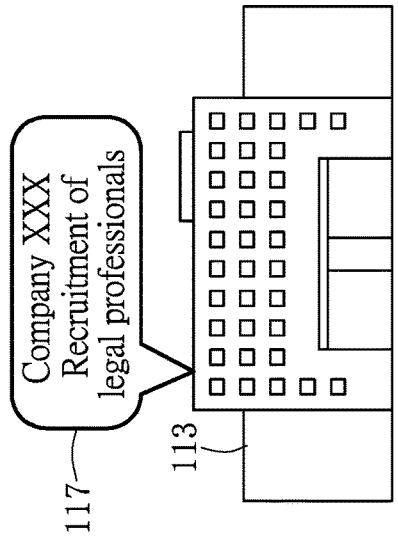
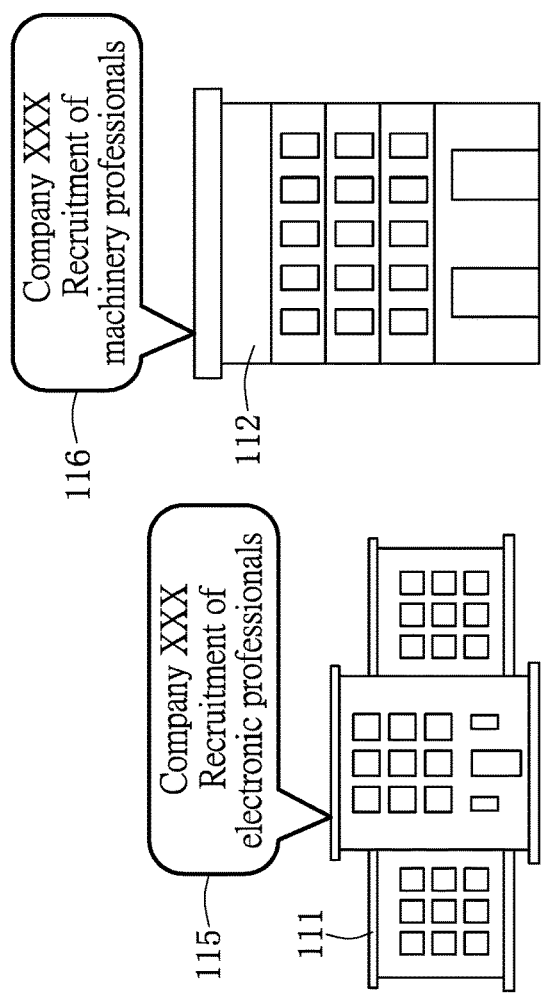
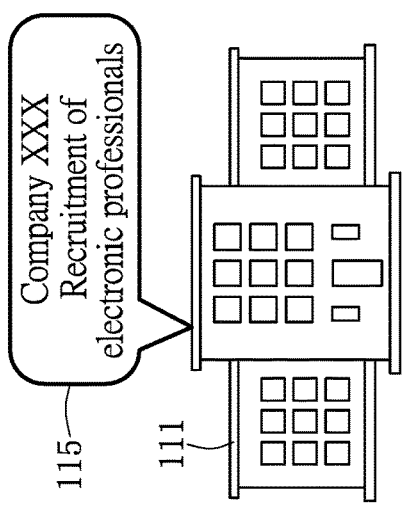
FIG. 10C
FIG. 10B
FIG. 10A

METHOD AND SYSTEM FOR REMOTE MANAGEMENT OF LOCATION-BASED SPATIAL OBJECT

BACKGROUND OF THE INVENTION

1. Field of the Invention

The present invention is relating to a method and a system for managing an object in a three-dimensional space, in particular to a method and system that allow a subscriber to remotely manage disposition of a location-based spatial object.

2. Description of Related Art

According to a conventional application, a user utilizes a mobile device to execute a proprietary application, e.g. an APP, for activating a camera module. The camera module is driven to capture a real scene and the real scene is displayed on a screen of the mobile device. The application enables an augmented reality technology that allows an image object to be shown in the real scene.

In general, the augmented reality technology requires a software routine to recognize a marker within the real scene through the camera module of the mobile device. The marker is referred to in order to initiate the image object. The augmented reality technology uses a well-defined correlation between the marker and the image object to show the image object in the software routine.

Another conventional augmented reality technology relies on location-based information to initiate the image object. This means that the image object defined in the software is initiated based on a location of the mobile device. A user manipulates the mobile device to find out and display the image object based on its location that is rendered by a global positioning signal generated by a GPS module installed in the mobile device. In the meantime, an azimuth angle signal can be generated by a gyroscope of the mobile device for positioning an elevation angle of the mobile device. This positioning information acts as reference provided for a server that directs the software program in the mobile device to show the image object.

These mentioned technologies of augmented reality or location-based method merely create a circumstance that allows the user to experience reality and facilitate recreation. Moreover, a search engine company allows an advertiser to buy an advertisement, which affects the ranking of a search result. The advertisement is such as a relevant ad provided to a user who searches in a related field.

However, none of the conventional technologies provides a platform that allows any user to set up any location-relevant image for others to search a location-based image using the augmented reality technology.

SUMMARY OF THE INVENTION

The disclosure in accordance with the present invention is relating to a method and a system for remote management of a location-based spatial object. A management server is provided for a subscriber to conduct remote management of the spatial object at a specific location and direction. The spatial object is such as a virtual object disposed within a spatial range. A user can search the spatial object within a three-dimensional space using a mobile device with an augmented reality (i.e., AR) technology. When the system determines that a location and pointing direction of a mobile device falls within a range relating to a spatial object, the mobile device is able to display the spatial object combined with a real scene.

In one embodiment, in the method for remote management of the location-based spatial object, a server is used to render a remote management interface that allows a subscriber to conduct the remote management using a computer system. The subscriber operates a remote management interface to configure a spatial object and its corresponding spatial information over a network. The spatial information includes a ground-position data of the spatial object or image information of a real scene associated to the spatial object. The spatial object can be in form of a text, a picture, a video or a sound, or a combination thereof.

Next, the server receives search criteria corresponding to the spatial object, and creates a location-based spatial object according to a search result.

In one of the embodiments, a remote management interface is initiated for purpose of remote management. The interface allows a subscriber to conduct the remote management for locating the spatial object. A street view of the real scene may assist the subscriber to set up the placement of the spatial object.

One of the objectives of the present invention is to provide a system for the subscriber to remotely set up one or more placements of multiple spatial objects. The ground-position data and space-angle data associated to each spatial object are produced through the remote management interface. Some search criteria may for searching the spatial object can be generated based on a time limit, a viewable range and/or a user range.

In the system for remotely managing the location-based spatial object, a database used to store the spatial objects, every spatial object's positioning data and/or image data, and the search criteria associated to the spatial object are included. A server is also provided. One or more processors in the server are used to perform the method for remote management of the location-based spatial object.

BRIEF DESCRIPTION OF THE DRAWINGS

FIGS. 10A to 10C show diagrams of various arrangements of the spatial objects.

DETAILED DESCRIPTION OF THE PREFERRED EMBODIMENTS

Figure 1A:
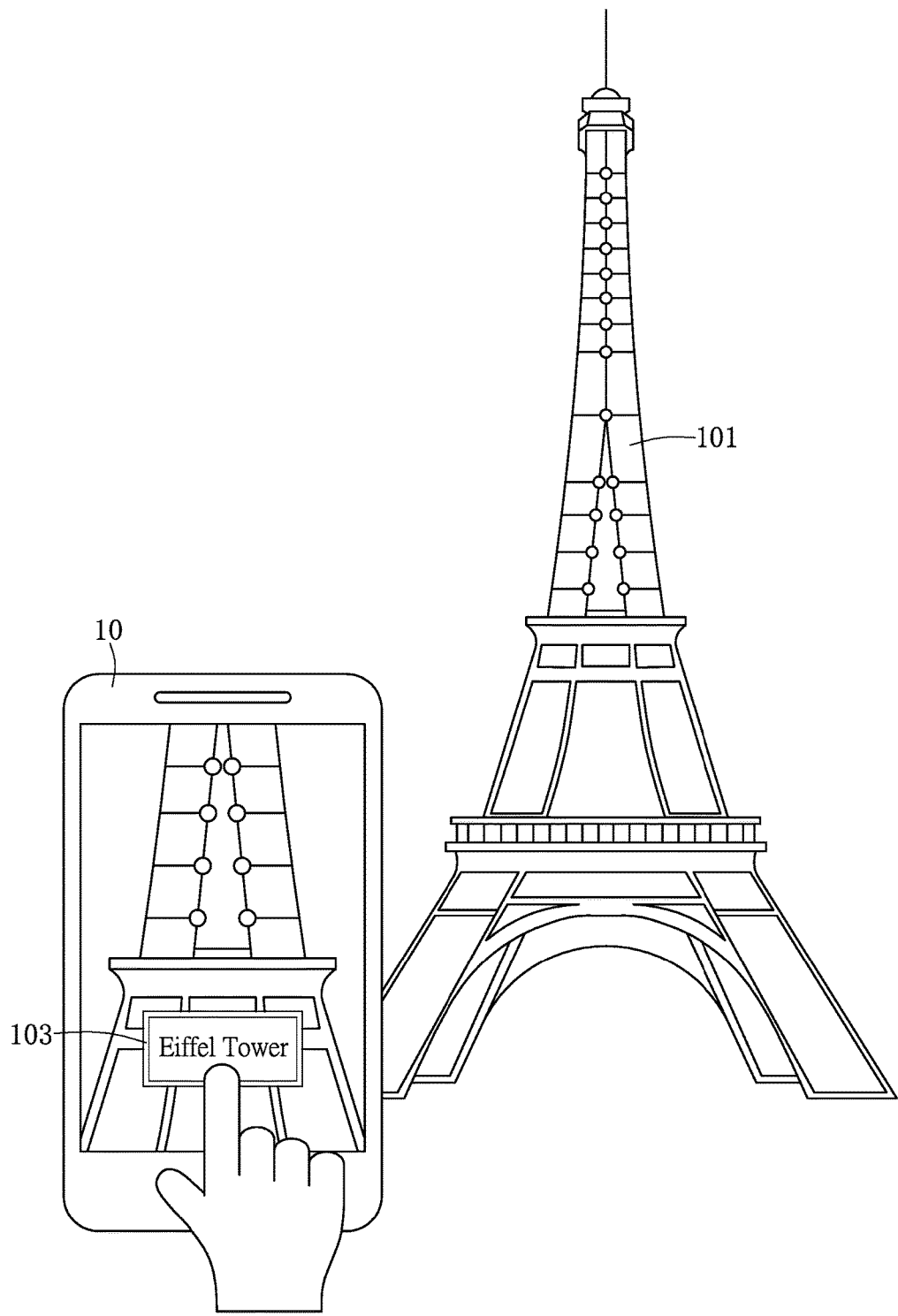
FIGS. 1A to 1C show schematic diagrams describing a circumstance of a user manipulating a mobile device to create a location-based spatial object in one embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The disclosure in accordance with the present invention is relating to a method and a system for remote management of a location-based spatial object. The system introduces a cloud system that allows a user to operate a mobile device installed with a software program to search a spatial object. In particular, the spatial object is an object located in a three-dimensional space, e.g., a real space, where the user is situated. The cloud system renders a search service that outputs the spatial object according to positioning information of the mobile device and image information of a real scene associated with the spatial object.

The system of remote management in accordance with the present invention provides a management server and a database. The management server initiates a remote management interface that allows a subscriber to access the location-based spatial object and its content over a network. The system provides a search database that renders the search service. A search engine is therefore established and provided for the user to search the location-based spatial object by operating the mobile device with the corresponding positioning information.

The system for remote management of the present invention renders a management server that allows the subscriber to remotely manage the spatial object at a specific position and orientation. The system further assigns the spatial object with search criteria such as a time limit, a viewable range, and/or a user range. Through this system for remote management, the subscriber need not personally visit the place of the spatial object.

The spatial object is exemplarily a virtual object. The user can search the spatial object using his mobile device when the positioning information of the mobile device conforms to the spatial information of the spatial object. In addition to obtaining the virtual object while viewing the real scene, the user can access more information relating to the spatial object. The spatial object can be in form of one or any combination selected from a group of a text, an image, a video, and an audio.

The subscriber can be an advertiser, and the spatial object can be an advertisement. The system allows the advertiser to place the advertisement in form of the spatial object in multiple places. While the advertiser can still send a person using a mobile device with the software program to set up the spatial object on-site, through the system for remote management of the location-based spatial object in accordance with the present invention, the advertiser can concurrently set up various spatial ranges for multiple spatial objects viewable for users. The plurality of spatial objects recorded in the system implement a search engine for the spatial objects.

In an exemplary example, the advertiser is such as an operator of a chain store, a department store, a shop, or a shopping mall. When a chain restaurant launches a new product or a promotional activity, the remote management system allows the operator to place advertisements to restaurants at different locations. The system also allows the operator to configure multiple viewable ranges and various time limits for the restaurants. After that, the user can utilize the mobile device to search the spatial object and gain information relating to the restaurant.

Figure 9C:
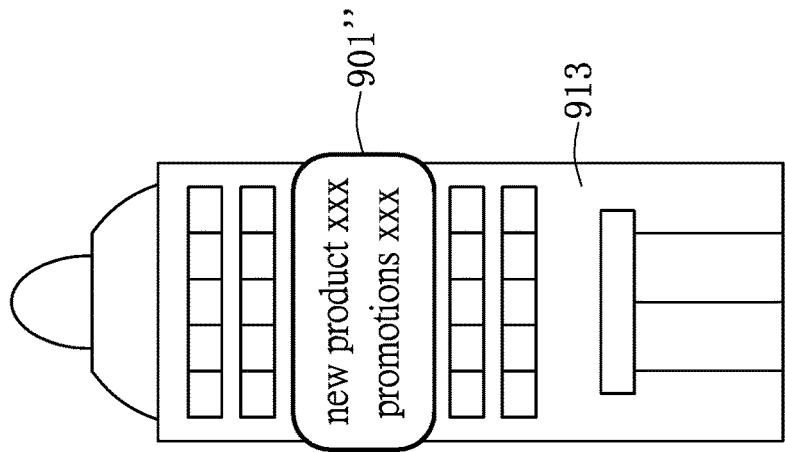
FIGS. 9A to 9C show schematic diagrams of various placements of the spatial objects in accordance with the present invention.
Figure 9B:
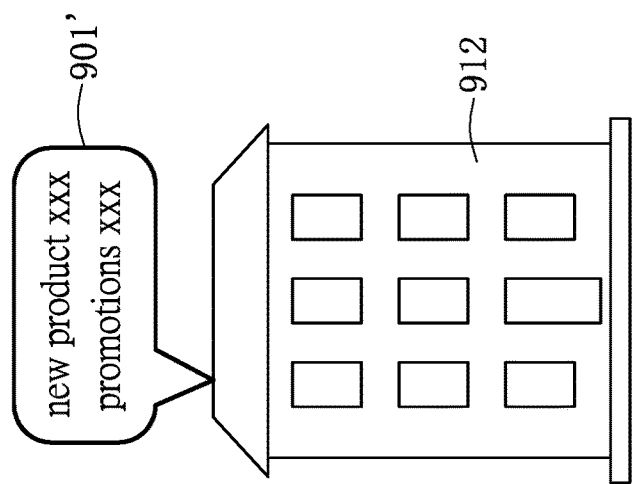
Figure 9A:
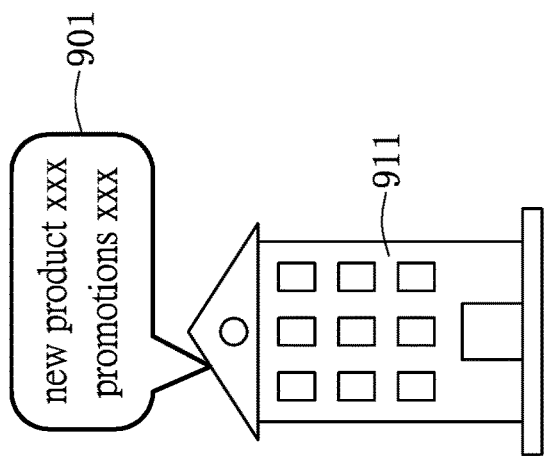

Several exemplary examples are shown in FIGS. 9A-9C that depict the spatial objects disposed at several places. This example shows an advertiser being able to configure a same virtual message to the spaces associated with multiple chain stores through the remote management interface at once. In FIG. 9A, a spatial object 901 is set over a scene 911. The spatial object 901 represents marketing content, such as a new product 'xxx' and a promotion 'xxx'. Similarly, FIG. 9B shows another diagram of another scene 912 where a spatial object 901' is set. FIG. 9C shows a spatial object 901" associated with one further scene 913. The system for remote management of the location-based spatial object allows a subscriber to set spatial objects to many places at the same time, and also precisely configure the ground position and space angle for each spatial object at its associated location.

In one example, the system allows a company to conduct recruitment when the company wishes to hire college graduates. The company can put the location-based spatial objects relating to the recruitment information at the gates of many universities via this remote management system. The system also allows the company to set a viewable range and a time limit of the spatial object. A student in one of the universities can use a mobile device to view the school through a software program and see the recruitment information within the viewable range and the time limit.

FIGS. 10A to 10C show schematic diagrams describing a company setting up similar spatial objects, e.g. recruitment advertisements, at different locations such as the campuses.

In FIG. 10A, there is a spatial object 115 on a scene 111, e.g. at a school entrance. The spatial object 115 reads "a company recruits electronic professionals." Similarly, FIG. 10B shows a schematic diagram of a spatial object 116 configured to be attached to another scene 112. This spatial object 116 reads "a company recruits machinery professional." FIG. 10C shows a spatial object 117 reading "a company recruits legal professionals" to be attached to a scene 113.

In the case of an individual subscriber, the system also allows the individual subscriber or enterprise subscriber to set up a single spatial object to be at a certain location or direction, to have a time limit, or to be viewable by one or more users when the subscriber cannot visit the place in person. In other words, the individual subscriber can authorize one or more users in a group to access the spatial object via the system. The authorized user can then operate a mobile device with the related software program to access the spatial object within viewable range, and the spatial object is able to combine with an instant real scene.

After that, the system provides a service for the user to search for the spatial object(s) at the location where the user operates his mobile device. The positioning information generated by a sensor of the mobile device in operation is automatically transmitted to a cloud system. In the meantime, a camera of the mobile device is activated to capture a real scene image at the location. The image information extracted from the real scene image acts as auxiliary information for the purpose of positioning. The system provides a search result of the spatial object(s) according to the positioning information and image information. The mobile device then displays the spatial object combined with the real scene image.

The system for remote management of the location-based spatial object in accordance with the present invention is implemented by a cloud system. The cloud system provides a software program for the end user to set up the spatial object(s) at various locations, and results in establishment of consolidated information for spatial objects of a database. The system allows the subscribers to set up the spatial objects remotely.

Figure 1B:
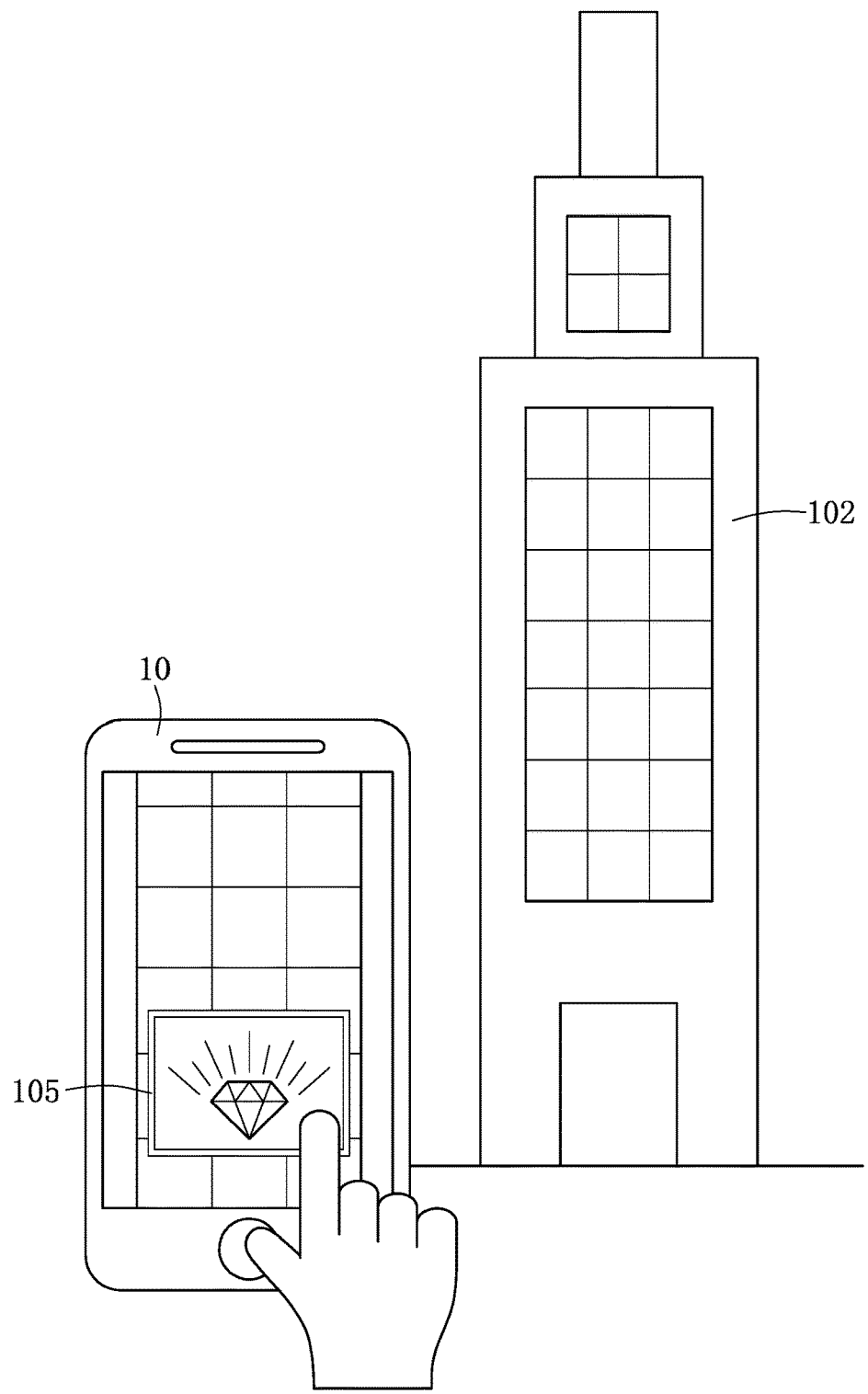
Figure 1C:
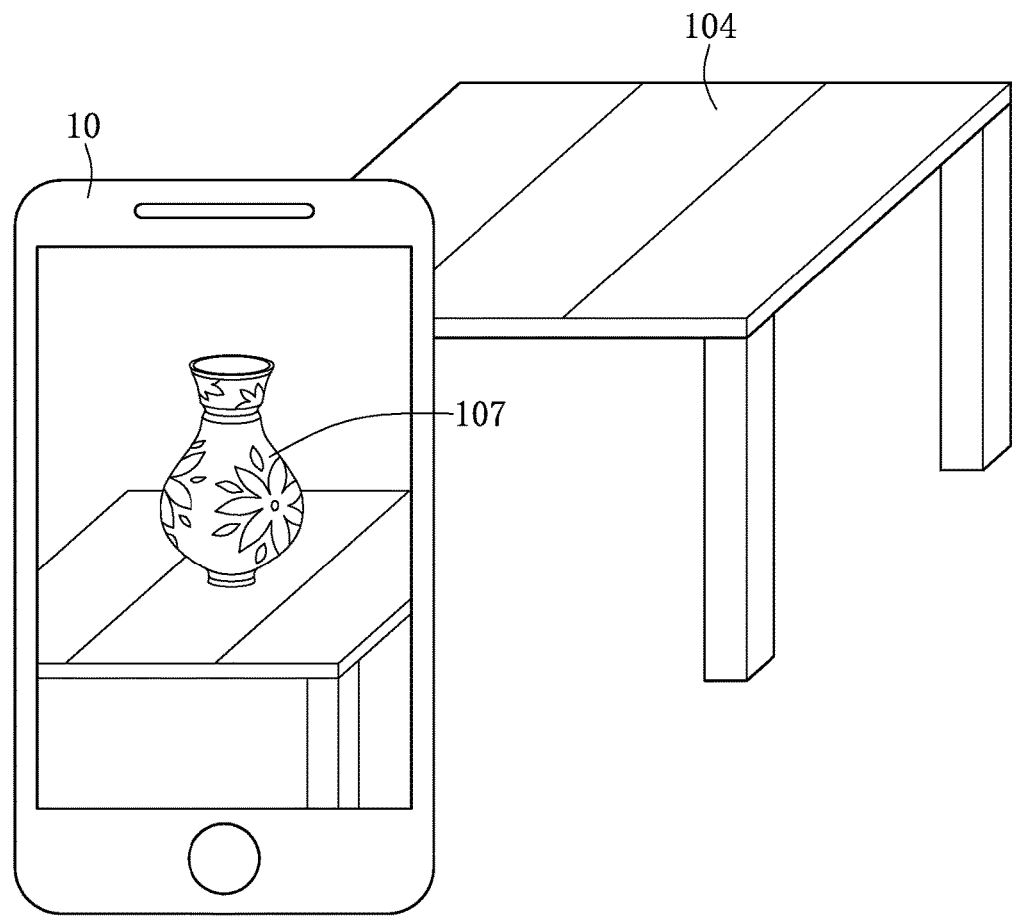

Several schematic diagrams illustrating circumstances describing the method for creating a location-based spatial object using a mobile device are shown in FIG. 1A through FIG. 1C.

As FIG. 1A shows, a user utilizes a mobile device 10 to install a software program provided by an application system. The software program is such as an APP installed in an intelligent device. When the software program is initiated, the operation is under a data establishment mode. A camera module of the mobile device 10 is activated. Through the user's manipulation, the mobile device 10 is directed toward a target to be annotated. The target is such as a building, a shop, a landscape, or an article. Through a screen of the mobile device 10, the user can see a real scene 101 relating to the target. After that, an Augmented Reality (AR) technology can be applied. The user can utilize a touch-sensitive display of the mobile device 10 or other input methods to add a new message onto a region of the real scene 101. The message can be a text, a picture, a video or a sound, or a combination thereof.

This example shows the user standing before a famous attraction, e.g. the Eiffel Tower. The user manipulates the mobile device 10 to point toward the real scene 101, and annotates a note such as 'Eiffel Tower.' This annotation is a spatial object 103 defined by the application system of the present invention.

After that, the user is required to confirm the spatial object 103, e.g. the annotation, accompanied by its corresponding spatial information in the real scene 101. The software program executed by the mobile device 10 transmits the data of the spatial object 103 and its corresponding spatial information to a server or a host of the application system. The spatial object 103 can be any type or any combination of a text, a picture, a video, and a sound. The mentioned spatial information includes a ground-position data, a space-angle data, and image information of the real scene 101 when the spatial object 103 has been created. The space angle can be a combination of an azimuth angle and an elevation angle.

Under a search and display mode, the image information of the real scene 101 indicates the information of color blocks and the lines between the adjacent color blocks with respect to the Eiffel Tower behind the spatial object 103. The ground-position data, the space-angle data, the color block data, and the line data form the parameters for searching the spatial object 103. These data are stored in the cloud-based server of the application system. When the user manipulates the mobile device 10 to generate and upload the spatial information, the cloud-based server obtains the spatial object 103 through a comparison operation. In general, the ground-position data and the space-angle data are the requisite factors for the cloud-based server to obtain the spatial object 103. If necessary, the server goes on to compare the color block data and/or line data transmitted by the mobile device 10; or first conducts a comparison using the line data, and then adding the color block data when the spatial object 103 cannot be identified through the line data. In consequence of the process, a search result is transmitted to the mobile device 10.

Further, the mobile device 10 displays the spatial object 103 through an interface initiated by the software program. A link icon can be used to link to further information. The spatial object 103 itself can also be a link button provided for the user to click for more information about the spatial object 103. Further information relating to the spatial object can be provided by the system; or the information can accompany the spatial object when the spatial object is created. In an exemplary example, when the spatial object indicates a link of a scenic spot, its introduction, traffic information, and nearby information can be obtained when the link is clicked. When the spatial object indicates a store, further information such as the store's contact information and discounts are provided for the user's reference.

FIG. 1B shows another diagram illustrating a circumstance for creating the location-based spatial object in one embodiment of the present invention. The user operates the mobile device 10 to initiate the software program. Under a data establishment mode, the camera module is activated. When the mobile device 10 is facing toward a scene 102, exemplarily a building, the system allows a spatial object 105 to be overlapped over several floors of the building precisely by an AR technology. The spatial object 105 is a picture in this example, and the picture conveys the information relating to the floors covered or about this scene 102.

For example, if a company is located at the floors directed at by the mobile device 10, the spatial object 105 can be the text, video, and/or picture introducing the company, or even the company's product advertisement or recruitment information. When the company annotates this spatial object 105, the spatial information relating to this spatial object 105 is transmitted to the server. The spatial information not only includes the image data of the spatial object 105, but also the ground-position data and the space-angle data of the mobile device 10, and the image information of the real scene 102 when the spatial object 105 is made. The image information of the scene 102 indicates the color block data and the line data between the color blocks of the background of the spatial object 105 when the spatial object 105 is made.

When the spatial information with respect to the spatial object 105 has been established, the ground-position data, the space-angle data and the image information for the spatial object 105 are transmitted to the application system, and act as the parameters stored in a database for searching for the spatial object 105 in the future.

Further, when creating the spatial object 105, the user can render it with more functions such as defining a URL link to the spatial object 105 that allows others to acquire more information when the spatial object 105 is searched for. The URL may direct to a webpage rendering an interface allowing the user to receive more interactive services such as conducting a video conference, a message conversation, or online shopping.

FIG. 1C schematically shows a circumstance depicting one of the embodiments of the present invention.

In the diagram, an indoor table is shown in a real scene 104. A mobile device 10 is utilized to capture an image of the real scene 104. Via a program interface, a spatial object 107 is selected and overlapped to the real scene 104. The example shows that a vase is added on the table. Some other types of messages such as a text, a video, a picture, or a combination thereof may also act as the spatial object. Similarly, the software program executed in the mobile device 10 transmits the spatial information with respect to this spatial object 107 to the server when the user has confirmed the position of the spatial object 107. The spatial information exemplarily includes the image of the spatial object 107, its corresponding ground-position data, space-angle data, and the image information of the real scene 104.

It is worth noting that the mobile device 10 may not easily acquire the GPS signal when encountered with an indoor real scene 104. In an exemplary example, the proprietary software program of the mobile device 10 can adopt the latest positioning information from the GPS module of the mobile device 10. The latest positioning information helps the application system estimate the position of the mobile device 10. For example, the mobile device 10's latest positioning information helps the software program locate the mobile device 10 if it is in a building or any area where the device cannot receive the GPS signal. However, even though the software program can estimate the position of the mobile device 10, the program cannot accurately locate the mobile device to find any spatial object. Hence, an accurate positioning technique is used by the software program of the present disclosure, in which the image information of the real scene captured by the camera module of the mobile device 10 is adopted as a reference for positioning. In one embodiment of the present invention, the image information can be a color block data and/or a line data associated with the real scene where the spatial object is positioned.

According to one of the embodiments, the real scene is usually a background image with respect to an added spatial object. Reference is made to FIG. 1C. A software program executed in the mobile device 10 processes the image of a table surface so as to form a color block data and a line data. A powerful cloud-based server may directly recognize the image and the image information that is used to precisely locate the spatial object. Preferably, the image information with respect to the image of the table surface can be simplified to a digital form that can be easily stored and used. Regardless of the computational capabilities of the server, rather than applying image recognition to the image, the digital message of the image can be utilized by the system in the pre-processing step to provide a fast searching service. The digital message of the image of the real scene provides sufficient information to expedite the searching service for accurate searching of the corresponding spatial object.

In other words, at the server end, an operation procedure is performed to locate the spatial object according to the ground-position data and space-angle data. In an exemplary example, a Global Positioning System (i.e., GPS) installed in the mobile device is used to acquire the ground-position data; and a Gyroscope in the mobile device is utilized to obtain the space-angle data such as a combination of an azimuthal angle and an elevation angle of the mobile device. Moreover, under the search and display mode, the server will compare the image information such as the color block data relating to the real scene if the ground-position data and the space-angle data fail to accurately locate the spatial object. Still further, the server may use the line data to assist the searching process if the color block data is insufficient to locate any spatial object. The application system consequently provides a search result including at least one matched spatial object, or provides options to select from.

The ground-position data is generally read out from a positioning circuit, e.g. a GPS module, in the mobile device. The positioning data can also be obtained from other auxiliary positioning signals such as the signals from mobile stations or a wireless local area network. In an example, when the mobile device is located at a place where it cannot receive GPS signals, the application system regards the latest received positioning signals as the ground-position data other than incorporating the auxiliary positioning signals. Next, the application system receives the signals generated by a space-positioning circuit, e.g. a gyroscope, in the mobile device, and the signals form the space-angle data.

Figure 2A:
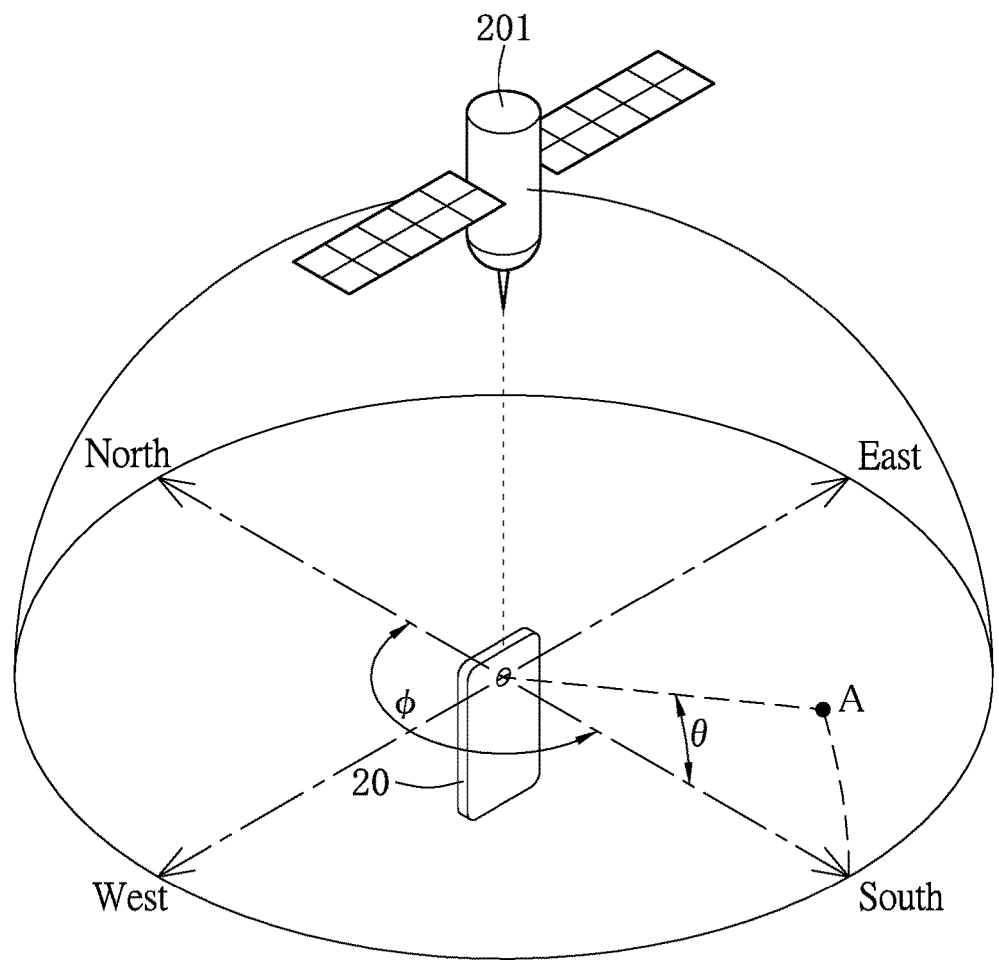
FIG. 2A shows a schematic diagram depicting coordinates indicating a space-angle data.

The schematic diagram shown in FIG. 2A depicts the formation of the space-angle data. A spatial coordinate system can be exemplarily defined by a pair of an azimuth angle $\varphi$ and an elevation angle $\theta$. The azimuth angle $\varphi$ is especially an angular measurement of a spherical coordinate system. In one aspect of the present invention, the mobile device 20 renders the spatial coordinate system. An origin of the spatial coordinate system indicates a position where the mobile device 20 held by the user, e.g. an observer, is located. The horizontal plane develops the spherical coordinates for defining the azimuth angle $\varphi$ ranging from 0-degree angle (direction of North), 90-degree angle (direction of East), 180-degree angle (direction of South), 270-degree angle (direction of West), and to 360-degree angle (back to direction of North). The azimuth angle can be described based on a reference axis, e.g. the North axis, for defining an azimuthal direction of the mobile device 20. For example, the direction A that a rear camera of the mobile device 20 points toward indicates the azimuthal direction. This direction A constitutes the azimuth angle $\varphi$ and the elevation angle $\theta$. Both the azimuth angle $\varphi$ and the elevation angle $\theta$ can be determined by a space-positioning unit in the mobile device 20. A combination of the azimuth angle $\varphi$ and the elevation angle $\theta$ forms the space-angle data for this direction A. When this space-angle data is combined with the ground-position data generated in the mobile device 20 through the positioning satellite 201, the mobile device 20 can be positioned by its position and pointing direction. A kind of spatial information is therefore formed. The spatial information is provided to the application system for obtaining a spatial object that is displayed on the mobile device 20 through an operation procedure.

Figure 2B:
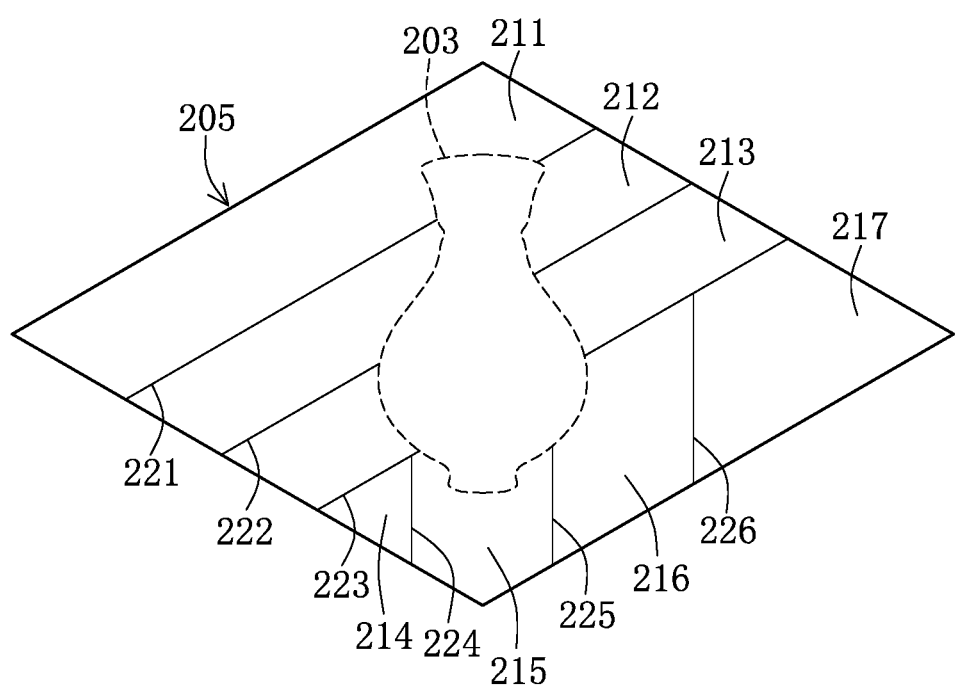
FIG. 2B shows a schematic diagram retrieving image information relating to a background of the spatial object.

FIG. 2B shows a schematic diagram depicting a technique to obtain the image information with respect to a spatial object. A spatial object 203 indicated by a dotted-line frame in the diagram is positioned over a background image 205. When the spatial object 203 has been created, the server acquires information relating to the spatial object 203 from the mobile device at the user end. The information relating to the spatial object 203 includes an image of the spatial object 203, and its positioning information such as a ground-position data and a space-angle data. The image information of the background image 205 can also be acquired by the server. The positioning information, optionally with the image information of the background image 205, constitutes the parameters of spatial information for locating the spatial object 203. Further, more information can be annotated to the spatial object 203. For example, a hyperlink can be annotated to the spatial object 203 that allows a user to acquires further information when he searches the spatial object 203. The hyperlink is clickable to link a webpage or a shopping interface for further interaction.

The image information of the background image 205 can be composed of a color block data and a line data through an image processing process. In one embodiment, the image processing process can be performed using a software program executed in the mobile device, or in the cloud-based server. The image processing process extracts the characteristics such as the color blocks and the lines therebetween from the background image 205. Both the color blocks and the lines act as the parameters for locating the spatial object.

In an exemplary example, the pre-processing method first sketches the background image 205, for example, using the lines 221, 222, 223, 224, 225, and 226. The blocks 211, 212, 213, 214, 215, 216, and 217 are formed by the lines 221, 222, 223, 224, 225, and 226. After that, an average of the pixel values in every block can be computed. The average denotes a color block data with respect to every block. In one further embodiment, a normalization method can be performed onto the pixels of every block so as to compute every block's characteristic value. The characteristic value is regarded as the block's color block data. It is noted that the image pre-processing method is not limited to the above disclosure. The image under the pre-processing method is not limited to be within any specific chromatic space, but it can be within an RGB space, a HSV (Hue, Saturation, and Value) space, or a CMYK (Cyan, Magenta, Yellow, and Black).

It is worth noting that, the information relating to the lines 221, 222, 223, 224, 225, and 226 for the background image 205 conveys a line data that acts as the reference for displaying the spatial object 203. Through the image processing process, the spatial object 203 can be positioned on the plane just as it should be placed.

Figure 3:
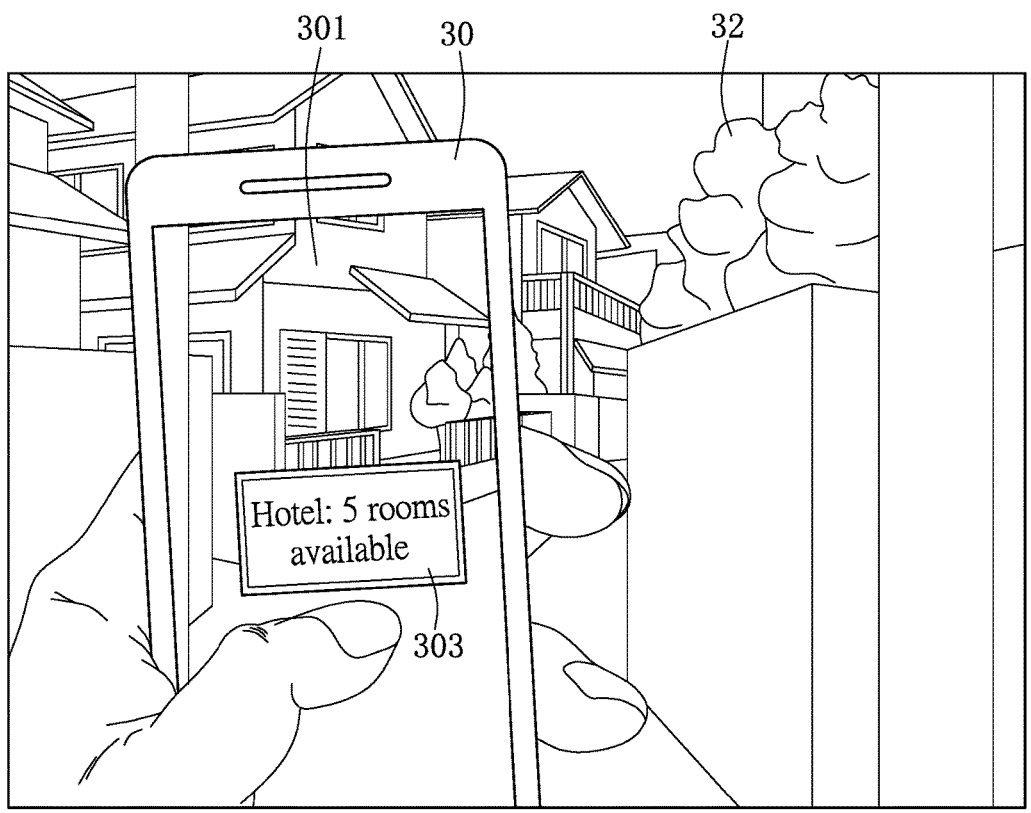
FIG. 3 shows a schematic diagram depicting a circumstance that a user uses a mobile device to search the spatial object.

Reference is made to FIG. 3 showing a circumstance that a user operates a mobile device to search a spatial object.

A mobile device 30 is such as a user's mobile phone, or tablet computer. The device for conducting the searching ranking can also be intelligent glasses, AR/VR glasses, or any type of portable electronic device. In one aspect of the present invention, the mobile device 30 retrieves the spatial object, e.g. a message 303, associated to the location and space from the cloud system while displaying a real scene image 32 on a display 301 of the mobile device 30.

In an exemplary example, a user carries the mobile device 30 to a location, and the system confirms that there is a message for the user due to the current location of the mobile device 30. The message can be designated to a specific user, the general users, or the users interested in the message, or the message can be a personal message for an individual user. The system can utilize a notification message or other ways such as vibration and sound to notify the user that there is a viewable message nearby. While the user is notified, the user operates the mobile device 30 to move in a space for searching a spatial object. The moving mobile device 30 around the space renders a movement of azimuthal angle over a horizontal direction, and another movement of elevation angle over a vertical direction. Reference is made to FIG. 2A, which shows the spatial information delivered to the cloud system. The cloud system returns a spatial object corresponding to the spatial information after a comparison process. Next, a software program executed in the mobile device 30 is initiated to gain the auxiliary positioning information from the image of the real scene 32, and transmit the information to the cloud system. An augmented reality technology is utilized to overlap the spatial object obtained from the cloud system with the real scene 32. In the current example, the spatial object such as a virtual message 303 displayed on the display 301 indicates that five rooms are available at the hotel.

Figure 4:
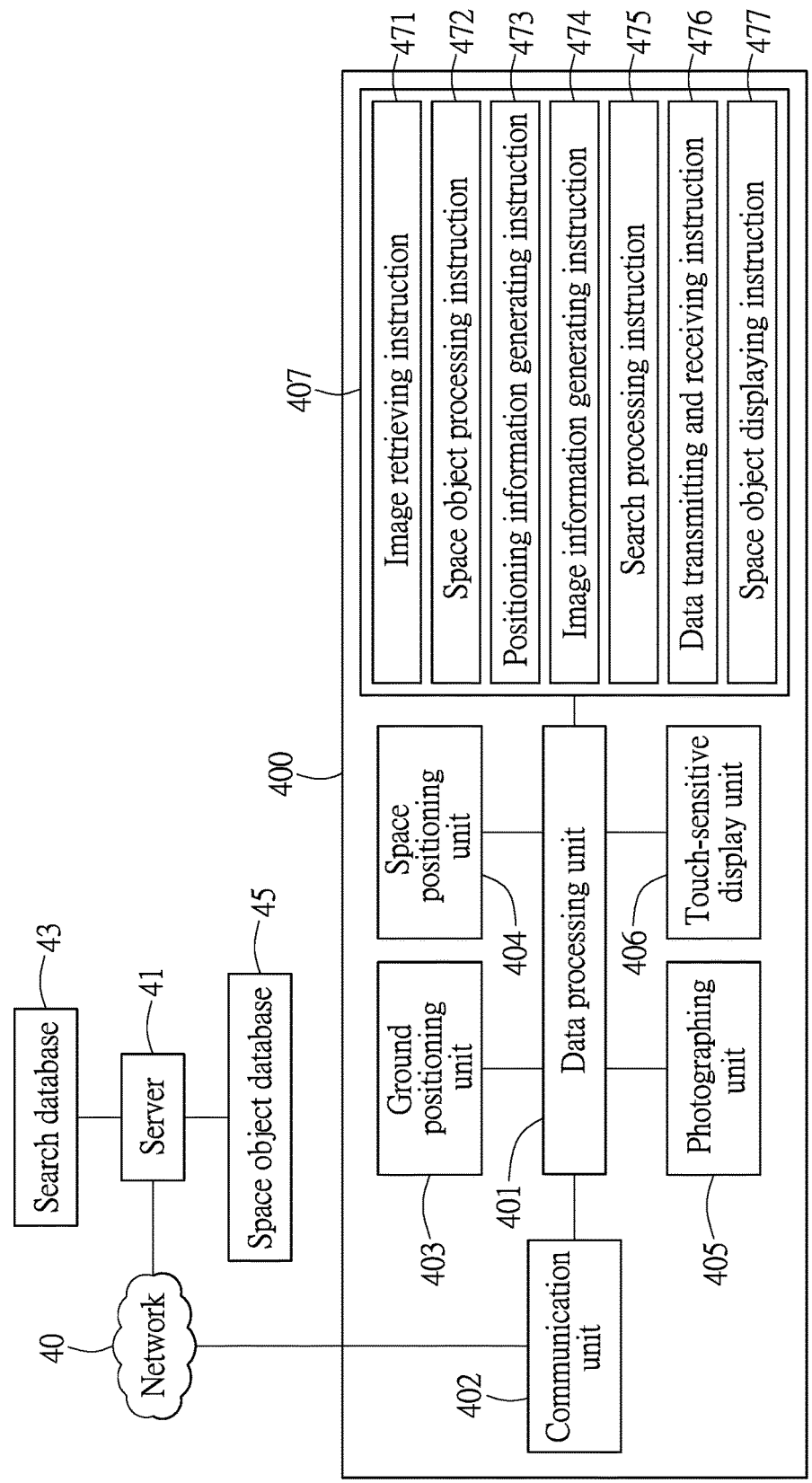
FIG. 4 shows a diagram describing hardware and/or software-implemented modules in the mobile device used to search the location-based spatial object in one embodiment of the present invention.

FIG. 4 shows a diagram depicting the software modules of the mobile device operating the method for searching location-based spatial object in one embodiment of the present invention.

The application system includes a cloud-based server 41. The server 41 is implemented by a computer system, or a cluster of multiple computer systems for operating various functions. The server 41 is mainly used to receive the data of a spatial object and corresponding spatial information uploaded by the user-end mobile device 400 so as to establish a database. Establishment of the database can be based on a search database 43 and a spatial object database 45. The database is used to record the data generated by the user-end mobile device.

The database is such as a data storage medium that can be separated to the search database 43 and the spatial object database 45. Both the databases 43 and 45 can be installed into one server, or different sites. The spatial object database 45 mainly records the data of the spatial object uploaded by the mobile device 400. The spatial object can be any type or any combination of a text, a picture, a video, and a sound. The video may comprehensively include a plane graphic animation or a 3D animation. The spatial object database 45 simultaneously acts as the source provided for the user to search for the spatial objects using the mobile device 400. The search database 43 mainly records further information relating to the spatial object uploaded by the mobile device 400. The information is such as the positioning information with respect to the spatial object, and/or including the color block data and the line data corresponding to the scene where the spatial object is positioned. The color block data and the line data extracted from the real scene relating to the spatial object act as the reference for locating the spatial object. The server 41 performs an operation procedure of comparison using the spatial information recorded in the search database 43. One or more spatial objects can be found in this preliminary procedure. Every spatial object has its identification that is delivered to the user-end device.

Furthermore, when the spatial information relating to the spatial object is formed by the user operating the mobile device 400, the searching criteria is also generated. The searching criteria such as a time limit, a viewable range, and/or a user range are configured to be uploaded to the search database 43.

For example, a spatial object is established at a place correlated to a real scene, and a time limit can be set. The time limit acts as one of the searching criteria. The time limit restricts the user to merely searching for the spatial objects within a time period in which the seeable spatial objects also meet the other searching criteria, such as the conditions including the positioning information and image information. The viewable range confines a seeable distance from the real scene, a viewable plane-position range and/or a viewable space-angle range allowing the user to see the spatial object. The user cannot see the spatial object until the mobile device 400 held by the user moves within the viewable range.

Further, the user range allows the user to restrict who can see the spatial object. The number of the users who are allowed to see the spatial object is configurable, e.g. one or more people. Every user's identification (user ID) will be transmitted to the server 41 when the user operates the mobile device 400 to search for the spatial object. This user ID is one of the searching criteria.

The application system establishes the database, e.g. the search database 43 and the spatial object database 45, using a mass of data uploaded by a plurality of users. A search engine is therefore established, and renders a search service for the user operating the mobile device to search for the spatial objects.

The mobile device 400 is configured to operate the method for creating the location-based spatial object, and also for displaying the spatial object. The mobile device 400 connects to the server 41 over the network 40. The mobile device 400 includes the main circuit components such as a data processing unit 401 that is used to process the signals among the circuit components of the mobile device 400, and the other circuits electrically connected to the data processing unit 401. The mobile device 400 includes a communication unit 402 that is used to establish a connection to an external device. A ground-positioning unit 403 in the mobile device 400 is used to sense the position of the mobile device 400. A space-positioning unit 404 is used to sense the spatial position of the mobile device 400. A photographing unit 405 is for capturing the image of a real scene. A touch-sensitive display unit 406 allows the user to input commands using gestures.

The ground-positioning unit 403 can be implemented by the circuit component of a global positioning system that utilizes positioning signals received from a positioning satellite to generate ground-position data. The positioning scheme can be collaborated with the signals generated by other wireless base stations. The space-positioning unit 404 can be implemented by a gyroscope in the mobile device 400. The gyroscope is used to sense the spatial position of the mobile device 400 in a 3D space, so as to generate a space-angle data essentially constituted of an azimuth angle $\varphi$ and an elevation angle $\theta$. It is noted that the space-angle data and its range are established by associating to the real scene's ground-position data.

The application system includes a memory unit 407 inside the mobile device 400. The memory unit 407 is such as a non-transitory computer-readable medium that is used to store an instruction set. The instruction set executed by one or more processors of the mobile device 400 is to perform the sequences for creating and displaying the location-based spatial object. The main sequences of the instruction set are as follows.

First, an instruction (471) is initiated to activate a photographing unit 405 of the mobile device 400 for capturing an image of a real scene. The real scene is displayed on the mobile device 400. An instruction (472) is used to process a spatial object created in the real scene by a user using a touch-sensitive display unit 406 of the mobile device 400. The spatial object can be positioned at the front, rear, top, bottom, left or right side of the real scene. The spatial object can be freely created by the user, or selected from the spatial object database 45 of the system. The spatial object is transmitted to the server 41 in a form of any one or a combination of a text, a picture, a video, and a sound. An instruction (473) receives the signals made by a positioning circuit of the mobile device 400. For example, the signals are generated by a ground-positioning unit 403 and a space-positioning unit 404 of the mobile device 400, and form the positioning information for locating the mobile device 400. An instruction (474) is initiated to process the image of the real scene. The image information of the real scene is such as a color block data and a line data that are used to locate the spatial object. An instruction (475) allows the server 41 to receive the positioning information and the image information generated by the mobile device 400 under a search and display mode and afterwards to produce a search result. An instruction (476) is initiated to establish a connection between the mobile device 400 and the server 41, and is used to transmit and receive signals over the connection. The instruction (476) is performed to transmit the positioning information, especially the image information, to the server 41, and receive the search result therefrom. An instruction (477) allows the mobile device 400 to display the spatial object according to the search result provided by the server 41. The spatial object displayed on the mobile device 400 can be overlapped to the real scene.

It should be noted that the spatial object can be provided by a system that provides an image library, a video library, and/or a sound library; further, the system allows the user to create/upload the spatial object using some software tools; or the spatial object can be a picture photographed by the user.

Figure 5:
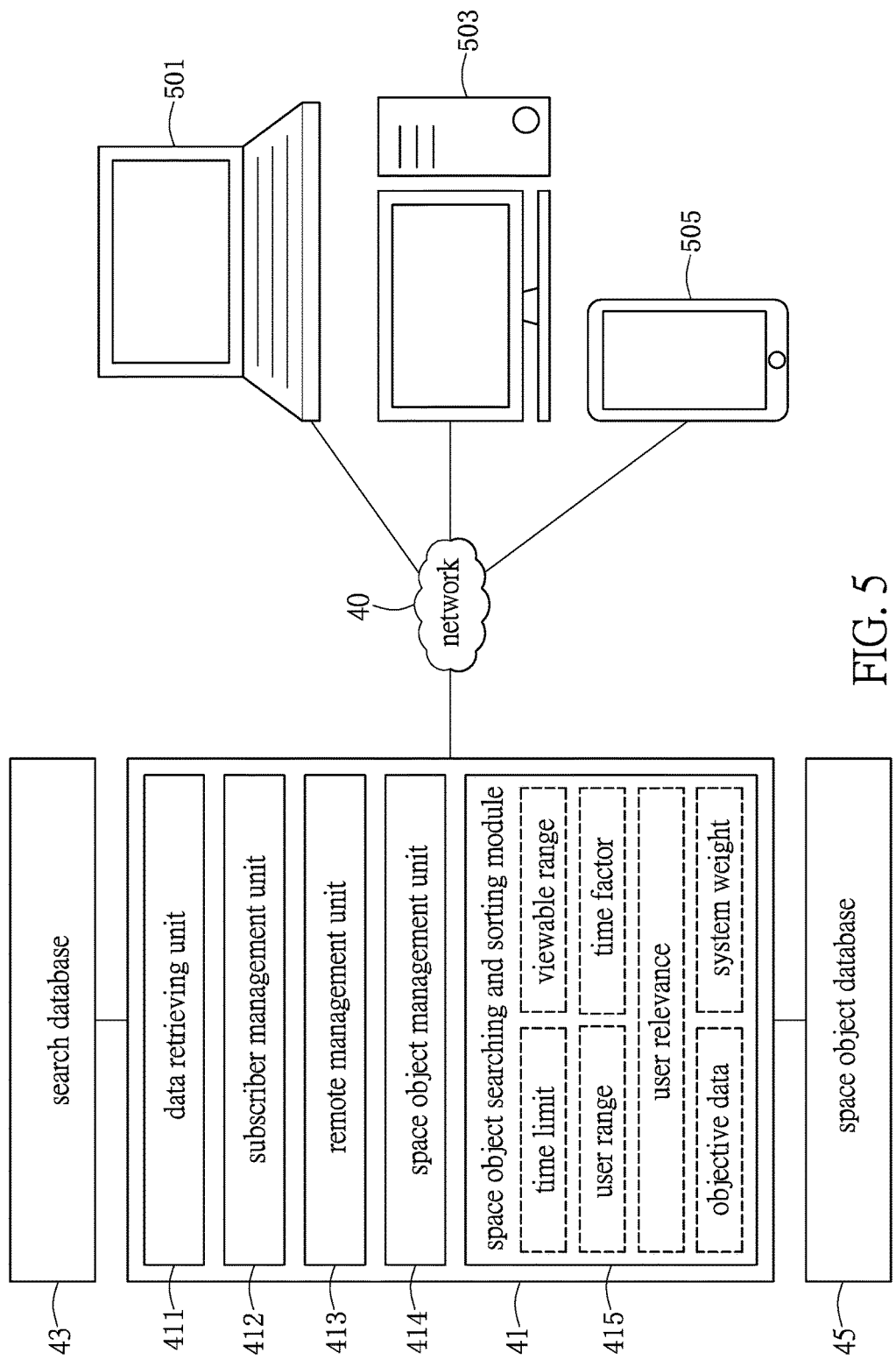
FIG. 5 shows a schematic diagram describing functional modules of a server of the system for remote management of the location-based spatial object according to one embodiment of the present invention.

FIG. 5 shows a diagram of functional modules of a server of the system for remote management of a location-based spatial object according to one embodiment of the present invention. The server embodies a cloud system that is implemented by hardware or with software. The cloud system includes a search database 43 that records multiple spatial objects, with each spatial object corresponding to one set of spatial information, e.g. ground-position data, space-angle data, or adding the information of color blocks and lines. Every spatial object has an ID acting as an index for searching. Every spatial object further corresponds to individual search criteria. The search criteria include at least one selected from a time range, a viewable range, and a user range. The viewable range is such as a horizontal angle and an elevation angle. The user range indicates a group of users who are designated to see the spatial object.

The spatial object database 45 of the system is used to store data relating to the spatial object. The spatial object is stored in the database in a specific form such as a text, a picture, a video or a sound, or a combination thereof. The ID of the spatial object acts as an index to link spatial information and search criteria of the search database 43 for the specific spatial object.

A server 41 is a computer system with operations made by the hardware and software and including one or more processors for performing the services allowing the subscribers 501, 503 and 505 to conduct remote management of the location-based spatial object over a network 40. The server 41 is used to process the spatial object and its spatial information made by the subscribers 501, 503 and 505.

The server 41 includes a data retrieving unit 411 that is a circuit-based solution to achieve data retrieval. For example, a network interface of the server 41 is utilized to link to the network 40 for receiving the spatial object set up by one of the subscribers, and the spatial information and search criteria of the spatial object. The spatial information includes the positioning data and the information relating to a real scene. The data retrieving unit 411 initially processes the information for establishing data for searching the spatial object.

A subscriber management unit 412 is used to manage the subscriber of the system using a memory and a set of computer instructions. The memory is used to store the subscribers and every subscriber's security data such as identification data and password. The system uses those data to establish a database for the subscribers.

A remote management unit 413 is implemented by a service program. The remote management unit 413 links to a front-end user interface and a back-end database (43, 45). The remote management unit 413 renders a user interface provided for the remote subscriber to set up the spatial object and the related content. The remote management unit 413 allows the subscriber to conduct the remote management by a specific program, e.g. a web browser or a proprietary program. The user interface initiated by the remote management unit 413 provides the subscriber with the option to upload the spatial object and the spatial information relating to the place where the spatial object is positioned. It is noted that the spatial object is a text, a picture, a video or a sound, or a combination thereof. The user interface renders an electronic map allowing the subscriber to select a place to set up the spatial object. The spatial information includes a space range allowing the users to see the spatial object. The space range indicates a ground position range and a space angle range. A set of search criteria such as a time limit and a user range can also be provided to confine the viewable range of the spatial object. The time limit denotes a validity period, and the user range denotes one or more viewable users.

A spatial object management unit 414, coupled to the remote management unit 413, is used to receive the spatial object and its corresponding content such as the spatial information (positioning information, image information) and search criteria. The spatial object management unit 414 creates a spatial object ID associated with the spatial object that can be linked to a specific subscriber ID. The subscriber ID is used to identify the subscriber. The various types of spatial objects are stored in the spatial object database 45. The information relating to the spatial object is recorded in the search database 43. The information in the search database 43 includes ground-position data, space-angle data, image information relating to the real scene, and search criteria associated to each spatial object.

In one embodiment, the system may utilize different servers to perform different works. For example, the server 41 provides remote management services for the location-based spatial object. The system may utilize another server to conduct a searching service for searching the spatial object, in which, a spatial object searching and sorting module 415 embodies the function of searching the spatial object.

The spatial object searching and sorting module 415 is used to process the search criteria with respect to the spatial object which the user wishes to search, and to process ranking criteria of the spatial object. The mentioned search criteria are such as a time limit, a viewable range, and/or a user range. The ranking criteria relate to a time factor, user relevance, objective data, and a system weight associated to the spatial object.

The spatial object searching and sorting module 415 is also in charge of communicating the system-end service with the software program of a user-end mobile device. A service sequence is used to receive the searching information generated by the mobile device and output a search result of spatial objects. In one embodiment, the service sequence compares the positioning information uploaded by the mobile device with the data in the search database 43. The system retrieves the spatial object data from the spatial object database 45 according to the search result. The spatial objects related to the search result are transmitted to the mobile device. Further, a ranking may be performed upon the search result in order to prioritize relatively interesting content to the user.

The ranking process introduces filtering criteria for the search result having multiple spatial objects. The filtering criteria cause the search result to be narrowed to a certain number of spatial objects and make the search result more meaningful.

In an exemplary example, the spatial object searching and sorting module 415 is operated to sort the spatial object according to user relevant information. The user relevant information is such as a user ID associated to the spatial information. The user relevant information is retrieved by the system. The system accordingly acquires the spatial object which is designated to be viewable for a specific user or a user range. The spatial object is set up to be a personal spatial object through filtering with the user ID. The personal spatial object can be configured to be viewable only to the one or more viewable users having priority ranking. On the contrary, users being excluded outside of the user range will not be able to see the spatial object. Therefore, the system allows the subscriber to set up the spatial object to be unavailable to certain users.

Further, the user relevant information can be a preference or historical data of the user. Still further, in the database, one or more content categorizations for the spatial object can be set via the remote management interface. The user sets up the preference in the system. The user can actively set up one or more content categorizations in the preference. The historical data includes the data related to the user collected by the system. For example, the historical data records a stay time and number of visits for the content associated to the spatial object. The system may regard the category of the content receiving longer stay time from the user as a preferred category. Similarly, the number of visits for the content of the spatial object can be used as a reference to judge the user's preference. The cloud system determines one or more preferred content categorizations according to the user's historical data.

The system prioritizes spatial objects with higher relevance to the user, and deprioritizes spatial objects with lower relevance to the user. The system accordingly provides a search result with a relevance ranking.

In one embodiment, the spatial object has a time property. A spatial object provider is permitted to set up a time factor for the spatial object. The time factor can be an available time period to show the spatial object. The available time period can be a time limit or a period of time, e.g. in the morning, at the noon time, or in the evening. The available time can be an available display time period to be searched. The system filters a preliminary search result according to a system time of the server in order to exclude the spatial objects that do not match the time factor. For example, the spatial objects not within the display time period are excluded from the search result; and the spatial objects that expire prior to the system time are also excluded.

The system may sort the spatial objects according to objective data. The objective data is such as a time of creation, an update time/rate, an available time period, a click through rate, and/or user reviews associated with every spatial object. The system decides a ranking of a sorting result based on these objective data. For example, the spatial object gains higher priority when it has a later time of creation; the spatial object gains higher priority when it has a higher updating rate; the spatial object gains higher priority when it has a higher access rate; or the spatial object gains higher priority if it gains higher reviews for its content.

Moreover, besides the above-mentioned time, user relevance, and the objective data used as reference for sorting, the system can impose a system weight to every spatial object in the database. The system allows the spatial object provider to assign a weight to every spatial object. The system calculates a system weight for every spatial object according to its individual weight, and the spatial object with higher system weight gains higher ranking.

In an example, the system weight can be an advertisement. The spatial object provider can be an advertiser. The advertiser can offer a price to request a higher priority ranking for his spatial object. The price becomes one of the system weights. The system changes the ranking of the spatial objects through the system weights. The spatial objects relating to government publicity activities or public information can also be prioritized by manipulating the system weights thereof.

Through the spatial object searching and sorting module 415, a ranking can be decided based on the various references of ranking. The ranking scenario is adjustable according to actual needs.

At last, the system delivers a result of searching and sorting to the mobile device which issued the request. The mobile device uses its display to show a spatial object with the highest priority when the mobile device receives one or more spatial objects from the server 41. Further, the mobile device shows a selected spatial object according to a selection instruction. The spatial object shown in the display of the mobile device is combined with the real scene captured in the beginning.

Figure 6:
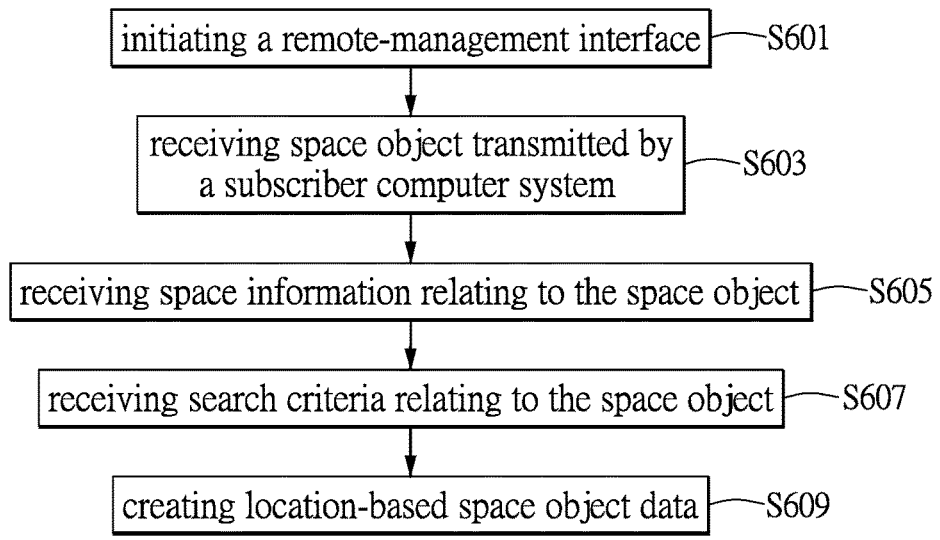
FIG. 6 shows a flow chart depicting a process of the method for remote management of the location-based spatial object in one embodiment of the present invention.

Reference is next made to FIG. 6, depicting a flow chart for illustrating the process for remote management of a location-based spatial object in one embodiment of the present invention. The process is performed in a server of the system. The server includes one or more processors that are used to perform the following process for the remote management.

In the beginning of the process, as in step S601, a system provides a remote management interface. The remote management interface can be in form of a web browser that initiates a script-based user interface. The user interface is provided for the subscriber to access the database and to conduct remote management. The subscriber downloads a proprietary program via the interface for remote management in accordance with the present invention. The remote management interface allows the subscriber to access the database after an authentication process. The subscriber uses a computer system to operate the remote management interface. The remote management interface allows the subscriber to set up one or more spatial objects at one or more places. The interface also allows the subscriber to set up the details of the spatial object. Further, a viewable range for every spatial object at a place can also be defined.

After the initial step for preparing the remote management interface, as shown in step S603, the system receives the spatial object data from the subscriber's computer system via the remote management interface. The spatial object is uploaded to the system in form of a text, a picture, a video, or a sound. At the same time, such as in step S605, the system receives the spatial information associated with the spatial object via the remote management interface.

Next, in step S607, the remote management interface allows the subscriber to input search criteria with respect to the spatial object. The search criteria are used to confine a range for searching the spatial object. In an exemplary example, the subscriber sets up a time limit for a spatial object; and the time limit is such as a validity period of a promotion made by a store. The time limit restricts the users' sight of the spatial object to only within the period that the store is open. The time limit can be set as daily, weekly, or monthly. The search criteria also restrict who can search the target spatial object; in which the subscriber can designate a user ID or a certain range of user IDs to view the spatial object as he wishes.

In step S609, the system establishes a database based on multiple location-based spatial object data created by multiple subscribers. The data in the database includes data of spatial objects, and each spatial object is associated with its requisite information such as spatial information and search criteria.

Figure 7:
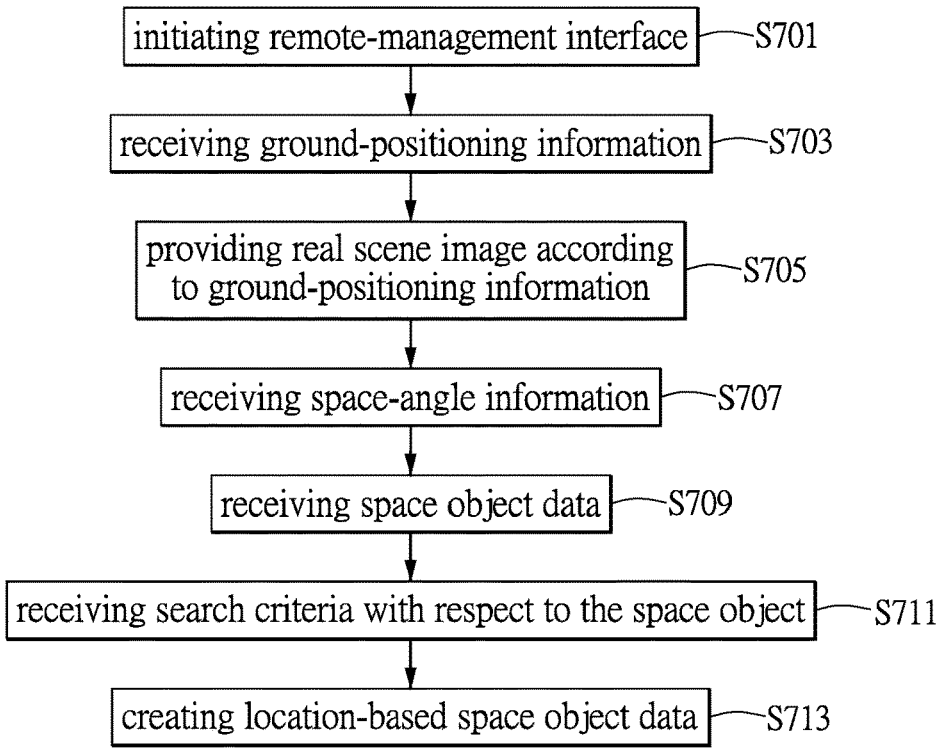
FIG. 7 shows a flow chart depicting a process of the method for remote management of the location-based spatial object according to one embodiment of the present invention.
Figure 8A:
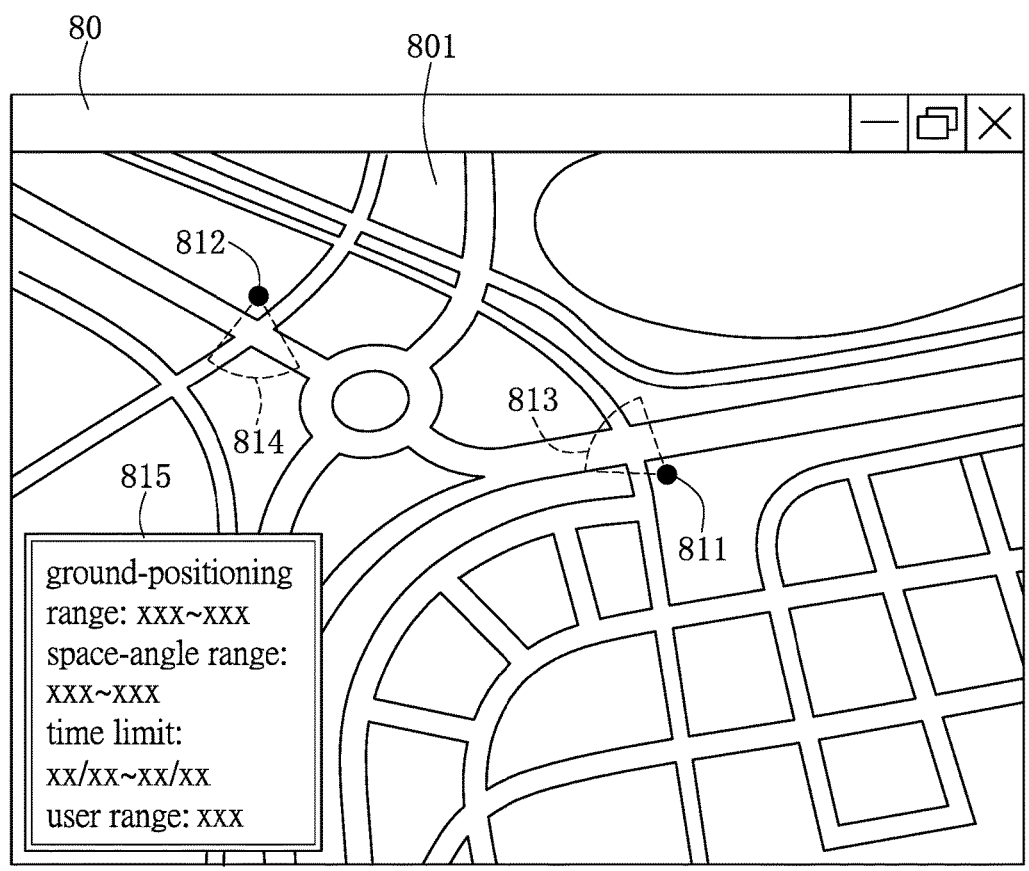
FIG. 8A and FIG. 8B show schematic diagrams of the interfaces of remote management in the system of the present invention.
Figure 8B:
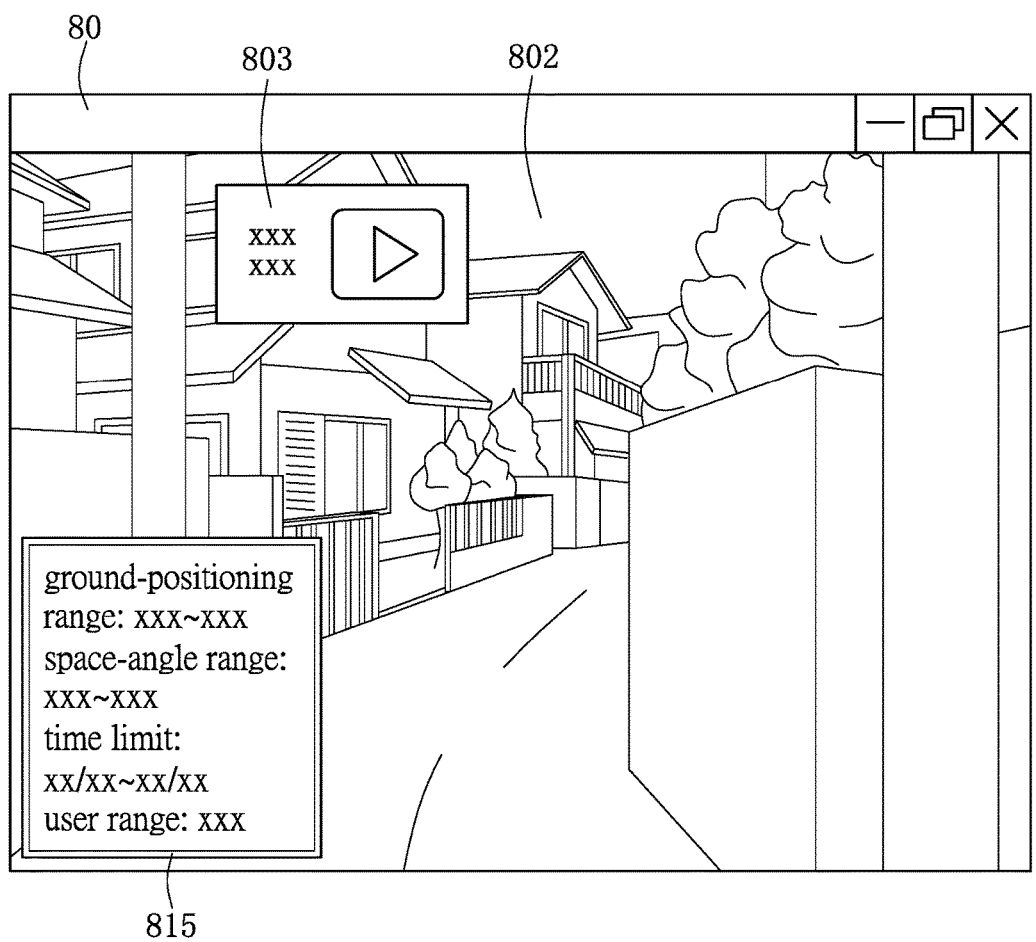

Reference is made to FIG. 7, in further view of the diagrams shown in FIG. 8A and FIG. 8B, showing a flow chart used to illustrate the method for remote management in accordance with the present invention.

In step S701, the system renders a remote management interface for the subscriber entering the system to set up the spatial object. For example, the subscriber utilizes a web browser or a proprietary program executed in a computer for performing the remote management.

The remote management interface is a graphical user interface displayed on the subscriber's computer. FIG. 8A shows a schematic diagram of a remote management interface 80 that initiates a first user interface 801. The user interface 801 allows the subscriber to conduct remote management and place a spatial object at one or more ground positions (811, 812) intuitively. Thus, in step S703, the system receives the ground-position data generated by the subscriber via the remote management interface.

Next, such as in step S705, the system provides a real scene corresponding to the ground-position data with respect to the spatial object made by the subscriber. The real scene is such as a street view related to the position. In FIG. 8B, a second user interface 802 shows a street view related to the real scene. The graphical user interface 802 allows the subscriber to arrange a space angle of the spatial object 803 including the content of the spatial object 803. The spatial object 803 in the present example is a combination of a video and text. The remote management interface allows the subscriber to arrange content, font, color, size, angle, and/or a rendering effect of the spatial object 803. The subscriber can also record a video, a sound, and a picture via this user interface.

After that, such as in step S707, the system receives space-angle data with respect to the spatial object. Further, the system can instantly resolve the image information of the real scene associated to the spatial object when the system shows a live real scene. The image information of the real scene is relating to its features of color blocks and lines. The image information acts as an auxiliary information for positioning. When the spatial object does not associate to any GPS-enabled positioning information or other positioning signals, the image information, e.g. the color block or line, will act as a positioning reference. It is worth noting that the end-user mobile device transmits the color block information extracted from the real scene image to a server when the ground-position data and space-angle data are not able to accurately position any spatial object. The color block information can act as a reference to perform the comparison for positioning the spatial object, or further the line information with respect to the real scene image may also act as another reference for the positioning process.

After the spatial information for the spatial object has been generated, such as in step S709, the system can receive various types of the spatial objects. In step S711, the system also receives the search criteria with respect to the spatial object. It should also be noted that the search criteria can be a time limit, a viewable range, and/or a user range.

FIG. 8A schematically shows a diagram describing several viewable ranges for the spatial objects at different ground positions 811, 812. The viewable ranges 813, 814 may direct toward different angles. The first user interface 801 allows the subscriber to modify the viewable ranges 813, 814 using a computer mouse, a touch-sensitive panel, or other input methods. The subscriber can modify a viewable distance from the position of the spatial object and a viewable range of a horizontal angle. The value of the viewable range including the distance and the horizontal angle will be changed concurrently with the value of the viewable range.

For example, via the remote management interface, the subscriber is allowed to define a viewable range for the spatial object. The viewable range includes an angular range around the ground position of the spatial object. The angular range restricts that the users can search the spatial object when they are within this angular range with respect to the spatial object. The remote management interface allows the subscriber to set up the viewable range with respect to the spatial object directly. In FIG. 8B, a space-angle data can be created for defining the viewable range with respect to the spatial object. A space-angle range is exemplarily defined for allowing users holding the mobile device toward an elevation direction to search the spatial object.

The remote management interface 80 shown in FIG. 8A or FIG. 8B renders a setting area 815 for setting search criteria. The setting area 815 allows the subscriber to adjust the viewable range, and also synchronously updates the values when the viewable range is modified. The example shows the ground-position data such as a ground-position range and a space-angle range.

The search criteria can include a time limit when time becomes a filtering factor. An available time can be set for showing the spatial object in a search result. For example, the spatial object can be a breakfast advertisement that will not be shown at any time but morning; the spatial object can be a special promotion of a store that is shown only at a certain period of the afternoon; and the spatial object can be a message that is left for a person only at a certain time. This means that the spatial object has a time property that can be a time factor for the system to filter the spatial objects. The setting area 815 in FIG. 8A or FIG. 8B for setting the search criteria shows an adjustable time limit for a specific spatial object.

The time limit acts as a filtering factor that makes the system judge whether or not the mobile device can search the spatial object at a time around a position. The system excludes the spatial objects that have expired validity periods. The system also excludes the spatial objects that are not in their available display time periods.

The search criteria can be a user range. The system is able to receive the user ID from the software program executed in the user-end mobile device. The system allows the subscriber to designate a user range associated with the user IDs that are allowed to see the spatial object. The spatial object is open to all users if the user range is not set. The setting area 815 in the remote management interface 80 exemplarily shows the user range: xxx.

Figure 8C:
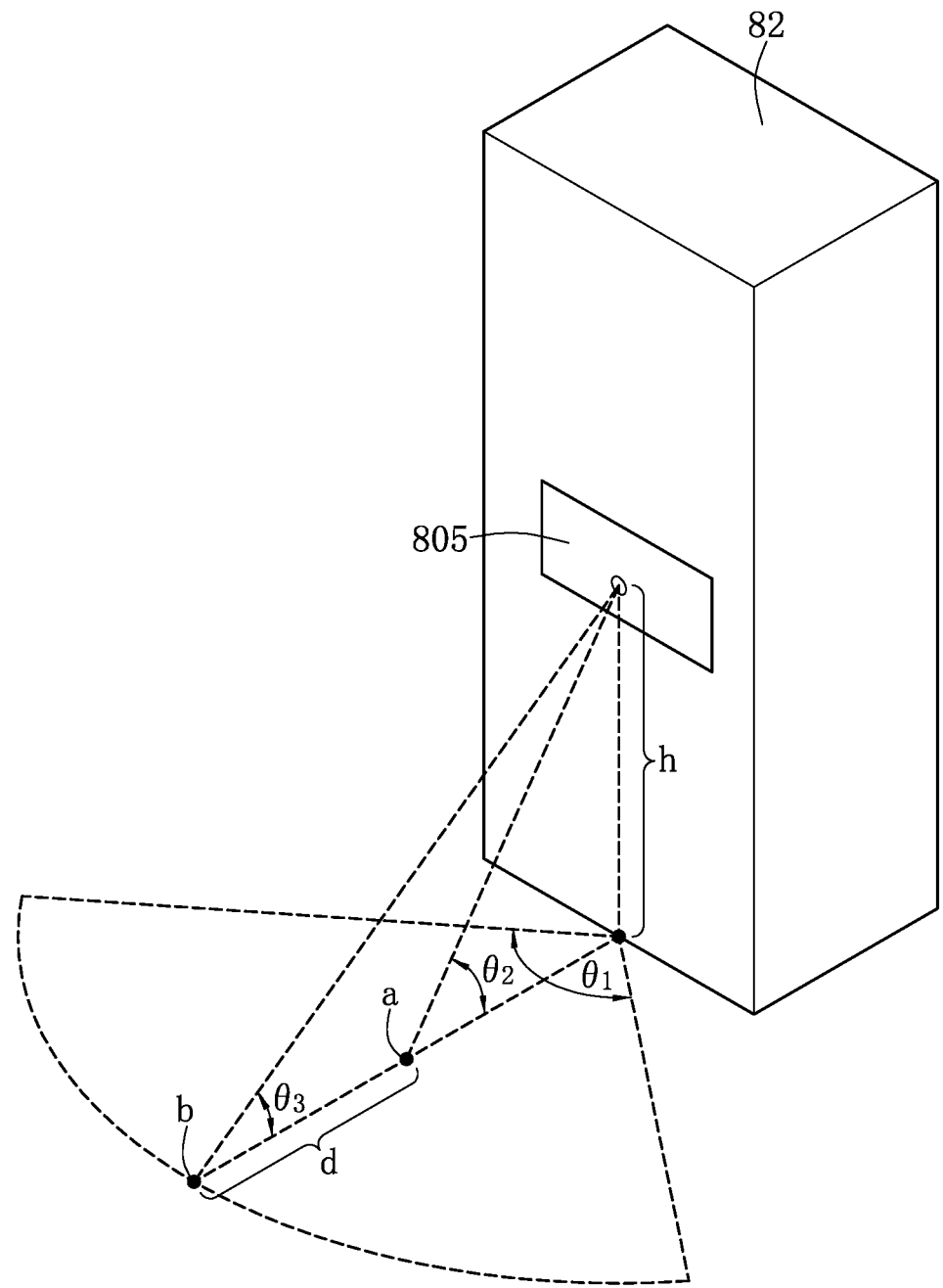
FIG. 8C shows a schematic diagram describing spatial information of a viewable range of the spatial object.

FIG. 8C shows a schematic diagram depicting a spatial object and its spatial information such as a viewable range.

A real scene 82 is attached with a spatial object 805. When setting the spatial object 805, the system prompts the subscriber to set up several items, such as a location for placing the spatial object 805, or in front of a specific scene. The information relating to the location includes an area occupied by the spatial object 805. For example, in FIG. 8B, the spatial object 803 is set to be in a street view before a specific scene. The subscriber can utilize a computer mouse or a touch gesture to set up the location and size of the spatial objects (803, 805).

When the spatial object 805 has been set, the system can simultaneously receive information relating to a background image associated to the spatial object 805. The background image can be resolved into color block information and line information that become the positioning information for the spatial object 805. After that, the user can accurately locate the spatial object at the position based on the positioning information. It should be noted that even if errors occur in the positioning, the system will not provide unreasonable results.

The spatial object 805 has a height 'h' when the subscriber sets up the spatial object 805 in the real scene 82. A viewable range defines a viewable angular range, e.g. the viewable range with a fan angle 'θ1' of FIG. 8A. It should be noted that the viewable angular range is not necessarily a symmetric angle in the space. In an exemplary example, the viewable range defines a distance range 'd' in front of the spatial object 805, and the distance 'd' indicates a distance between the positions 'a' and 'b'. The relationship between the position 'a' and the position 'b' forms the spatial information that is relating to a pair of visual angles 'θ2' and 'θ3' associated to the spatial object 805. The angular variables 'θ1', 'θ2', and 'θ3' define part of the viewable range. The viewable range includes the abovementioned ground-position data and space-angle data that restrict a range where the user can search and see the spatial object using his mobile device.

In step S713, the system establishes a location-based spatial object data according to the abovementioned information. The data includes the spatial object and its associated spatial information and search criteria.

Besides the above-mentioned embodiments of the present invention, the method for remote management also initiates the remote management interface allowing the subscriber to influence a search ranking through a price criteria corresponding to the spatial object. The price criteria are relating to a business-oriented operation of the system. Since pricing can influence the search ranking, an advertiser is allowed to differentiate his spatial object from the other location-related spatial objects through the price criteria. Further, via the remote management interface, the subscriber can set up one or more content categorization for every spatial object. The content categorization also affects the search ranking because the system can utilize a user's historical data and/or preference to filter the spatial objects through the content categorization. Therefore, the system can provide the spatial object that is of interest to the user.

The spatial object generated by the method for remote management in accordance with the present invention are provided for the users to search according to spatial information and search criteria set by the user-end mobile device. When a proprietary software program is executed in the user-end mobile device, a camera function is initiated to capture an image of a real scene, and a positioning circuit retrieves ground-position data and space-angel data from the mobile device. The server uses the information transmitted from the mobile device to conduct a comparison using a database. The computer sequence considers a time limit, a viewable range, and a user range associated to every spatial object, and finally renders a search result. The spatial objects in the search result can be sorted due to the system's ranking principles. The spatial object can be combined with the real scene. The user can see the spatial object that matches the spatial information and search criteria in the real scene.

It is intended that the specification and depicted embodiment be considered exemplary only, with a true scope of the invention being determined by the broadest meaning of the following claims.

What is claimed is:

1. A method for remote management of a location-based spatial object, comprising:
   a server providing a remote management interface;
   over a network, the server receiving a spatial object from a subscriber computer system via the remote management interface, wherein the spatial object is a virtual object, being a text, a picture, a video, or a sound, or a combination thereof, provided for a user to search and access more information relating to the spatial object using a mobile device in response to a relationship between positioning information of the mobile device and spatial information of the spatial object while viewing a real scene;
   the server receiving the spatial information with respect to the spatial object, and each spatial information including ground-position data;
   the server receiving search criteria with respect to the spatial object; and
   in the server, creating data of the location-based spatial object, including the spatial object, the spatial information and the search criteria relating to the spatial object.

2. The method as recited in claim 1, wherein the remote management interface is initiated with an electronic map and/or the real scene corresponding to the ground-position data.

3. The method as recited in claim 2, wherein the remote management interface is configured to set up ground-position data in the spatial information for the spatial object, and a range relating to the ground-position data is set up.

4. The method as recited in claim 3, wherein, a space-angle data and its range are established by associating to the real scene's ground-position data.

5. The method as recited in claim 4, wherein the server receives image information relating to the real scene corresponding to the spatial object when the spatial object is being set up in the real scene.

6. The method as recited in claim 1, wherein the search criteria including a time limit, a viewable range, and/or a user range.

7. The method as recited in claim 6, wherein the time limit is a validity period and/or a display time period set for viewing the spatial object.

8. The method as recited in claim 6, wherein the user range indicates one or more users who are allowed to view the spatial object.

9. The method as recited in claim 1, wherein a price criteria corresponding to the spatial object is set via the remote management interface for influencing a search ranking with respect to the spatial object.

10. The method as recited in claim 1, wherein one or more content categorizations for the spatial object is set via the remote management interface.

11. A system for remote management of a location-based spatial object, comprising:
    a database, recording multiple spatial objects and every spatial object's corresponding positioning and/or image information, and search criteria; wherein every spatial object has an ID utilized to link the positioning and/or the image information, and the search criteria corresponding to the spatial object in the database;
    a server, having one or more processors, used to perform a method for remote management of the location-based spatial object, and the method comprising steps of:
    providing a remote management interface;
    over a network, the server receiving a spatial object that is a virtual object being a text, a picture, a video, or a sound, or a combination thereof from a subscriber computer system via the remote management interface;
    the server receiving spatial information with respect to the spatial object, and each spatial information including at least ground-position data;
    the server receiving search criteria with respect to the spatial object; and
    in the server, creating data of a location-based spatial object, including the spatial object, the spatial information and the search criteria relating to the spatial object;
    wherein, the spatial object is provided for a user to search and access more information relating to the spatial object using a mobile device in response to a relationship between positioning information of the mobile device and spatial information of the spatial object while viewing a real scene.

12. The system as recited in claim 11, wherein the remote management interface is initiated with an electronic map and/or the real scene corresponding to the ground-position data.

13. The system as recited in claim 12, wherein the remote management interface is configured to set up ground-position data in the spatial information for the spatial object, and a range relating to the ground-position data is set up.

14. The system as recited in claim 13, wherein, a space-angle data and its range are established by associating to the real scene's ground-position data.

15. The system as recited in claim 14, wherein the server receives image information relating to the real scene corresponding to the spatial object when the spatial object is being set up in the real scene.

16. The system as recited in claim 11, wherein the search criteria, including a time limit, a viewable range, and/or a user range.

17. The system as recited in claim 11, wherein a price criteria corresponding to the spatial object is set via the remote management interface for influencing a search ranking with respect to the spatial object.

18. The system as recited in claim 11, wherein one or more content categorizations for the spatial object is set via the remote management interface.

19. A system for remote management of a location-based spatial object, comprising:
    a database, recording multiple spatial objects and every spatial object's corresponding positioning and/or image information, and search criteria; wherein every spatial object has an ID utilized to link the positioning and/or the image information, and the search criteria corresponding to the spatial object in the database;
    a server, having one or more processors, used to perform a method for remote management of the location-based spatial object, and the method comprising steps of:
    providing a remote management interface that is initiated with an electronic map or a real scene corresponding to the ground-position data;

over a network, the server receiving a spatial object from a subscriber computer system via the remote management interface;

the server receiving spatial information with respect to the spatial object, and each spatial information including at least ground-position data;

the server receiving search criteria with respect to the spatial object; and in the server, creating data of a location-based spatial object, including the spatial object, the spatial information and the search criteria relating to the spatial object.

20. The system as recited in claim 19, wherein the remote management interface is configured to set up ground-position data in the spatial information for the spatial object, and a range relating to the ground-position data is set up.

* * * * *